United States Patent [19]

Brown

[11] Patent Number: 5,595,398

[45] Date of Patent: Jan. 21, 1997

[54] WORK MACHINE

[75] Inventor: David J. B. Brown, Thirsk, United Kingdom

[73] Assignee: Caterpillar Inc., Peoria, Ill.

[21] Appl. No.: 432,044

[22] Filed: May 1, 1995

[30] Foreign Application Priority Data

May 4, 1994 [GB] United Kingdom .................. 9408790

[51] Int. Cl.$^6$ .................................................. B62D 21/04
[52] U.S. Cl. ...................... 280/763.1; 280/786; 180/312; 180/89.1
[58] Field of Search ...................... 280/781, 785, 280/786, 787, 791, 763.1, 764.1; 180/53.6, 53.7, 89.12, 291, 312, 89.1, 89.17, 89.18; 296/102, 190

[56] References Cited

U.S. PATENT DOCUMENTS 2,788,983  4/1957  Barenyi .................................. 280/785
3,101,150  8/1963  Janson et al. .......................... 180/291
3,734,223  5/1973  Anderson ............................. 180/89.12
4,167,278  9/1979  Holmes ................................. 280/786
4,770,427  9/1988  Howell et al. .......................... 180/312

FOREIGN PATENT DOCUMENTS 2066189  7/1981  United Kingdom .................. 180/89.1

Primary Examiner—Robert J. Oberleitner
Assistant Examiner—Frank Vanaman
Attorney, Agent, or Firm—Claude F. White

[57] ABSTRACT

A work machine includes a first chassis having a longitudinally extending spine with front and rear axles and wheels, and a second chassis having a base with an engine module and an operator's cab. The operator's cab and engine module are spaced apart to form a gap therebetween, with the gap adapted to accommodate the spine of the first chassis for assembling the first and second chassis together. In view of the modular construction, the second chassis can be attached to a number of different first chassis to provide versatility.

6 Claims, 7 Drawing Sheets

Fig.2.
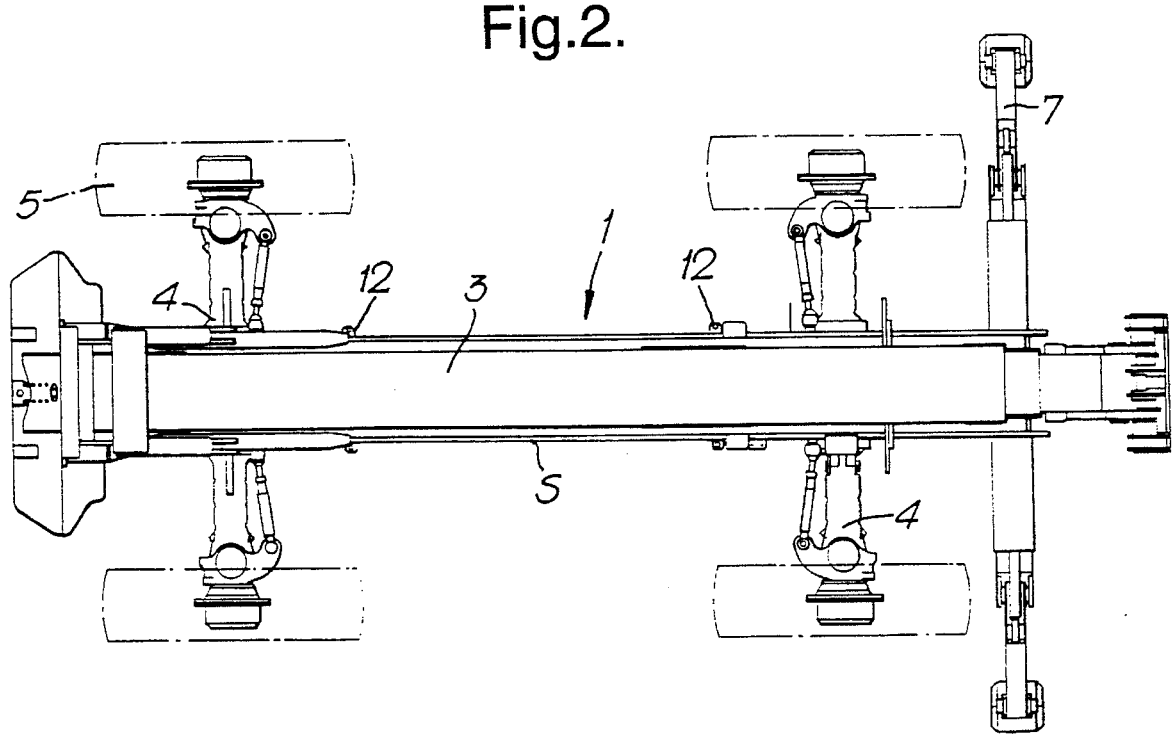
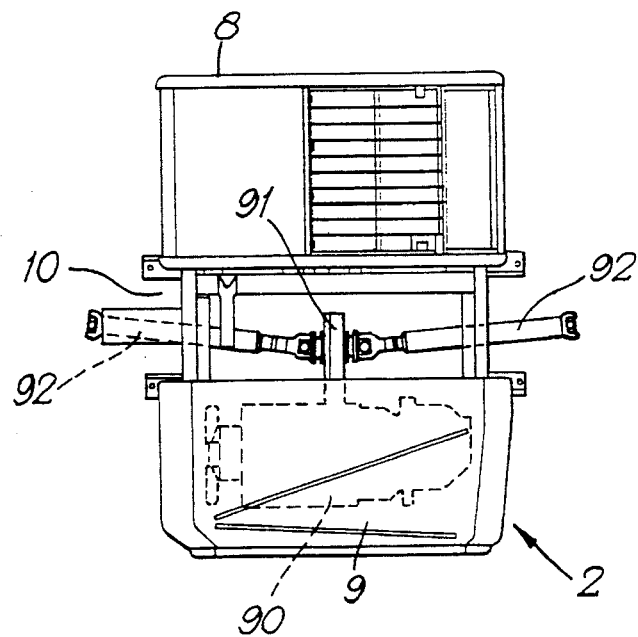

WORK MACHINE

TECHNICAL FIELD

A work machine is conventionally manufactured around a single chassis using parts specific to the particular machine.

DISCLOSURE OF THE INVENTION

According to the present invention, a work machine comprises a first chassis having a longitudinally extending spine and being provided with front and rear axles and wheels, and a separate second chassis provided with a base on which an operator's cab and an engine module are mounted laterally spaced apart to form a gap therebetween, whereby, upon assembly of the vehicle, the spine of the first chassis can be lowered into the gap and onto the base of the second chassis and the two chassis fastened together.

The invention thus provides an essentially modular construction in which one particular design of second chassis having the cab and engine module can be attached to a number of different first chassis to provide a corresponding number of different vehicles. This reduces the development time and the number of parts needed to make a range of products.

The modular construction reduces the assembly time by improving access to the components during the assembly operation.

Further, the modular construction permits the use of pre-painted components, thereby eliminating the cost of final painting.

Preferably the first and second chassis are bolted together, for example using four bolts adjacent to respective corners of the gap between the cab and engine module.

The first chassis is preferably provided with one or more of an optionally telescopic boom, outriggers, a ballast weight, and hydraulic cylinders. The second chassis is preferably provided with one or more of hydraulic cylinders. The second chassis is preferably provided with one or more of hydraulic valves, hydraulic pumps, filters, and pipe work on the engine side, and one or more of a fuel tank, and a hydraulic tank on the cab side. By dividing the components in this way, brackets and attachments can be concentrated on the second chassis. The absence of these from the first chassis, which is subjected to high stresses, enhances the overall structural integrity of the vehicle and permits the vehicle to be made lighter and cheaper.

The second chassis is preferably provided with at least one drive shaft projecting therefrom in such a way that when the two modules are fixed together, the or each drive shaft can be coupled to a respective part of the drive transmission on the first chassis to complete the drive transmission to the wheels. For this purpose, the second chassis may be provided with sufficient space below the gap to accommodate the or each drive shaft. Hydraulic couplings may also be needed, e.g. to connect the hydraulic equipment on the second chassis with the cylinders on the first chassis.

An example of a work vehicle constructed in accordance with the invention will now be described with reference to the accompanying drawings.

BRIEF DESCRIPTION OF THE DRAWINGS

FIG. 2 is a top view showing the two modules separated;

BEST MODE FOR CARRYING OUT THE INVENTION

Figure 1:
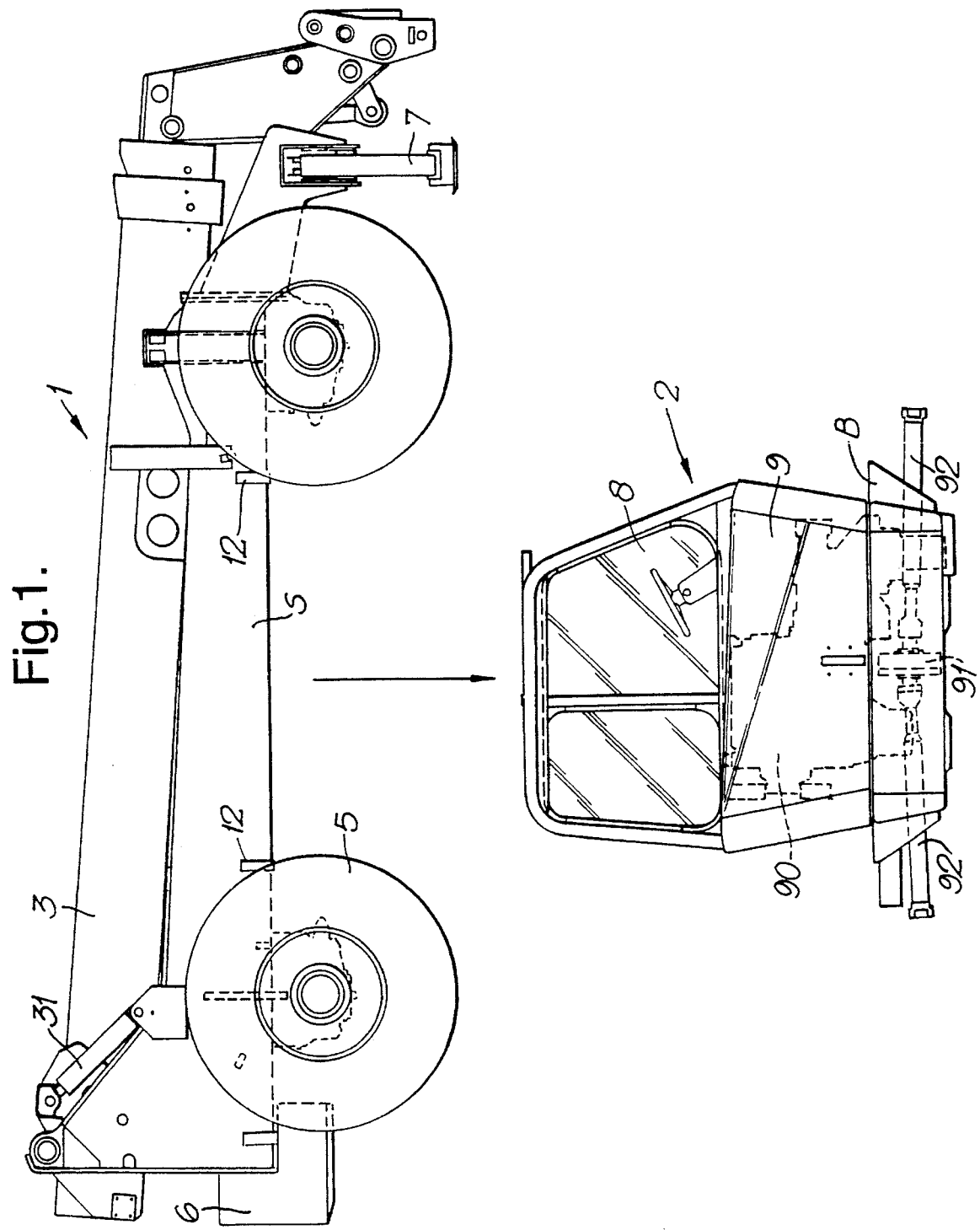
FIG. 1 is a side view showing the two modules separated.
Figure 3:
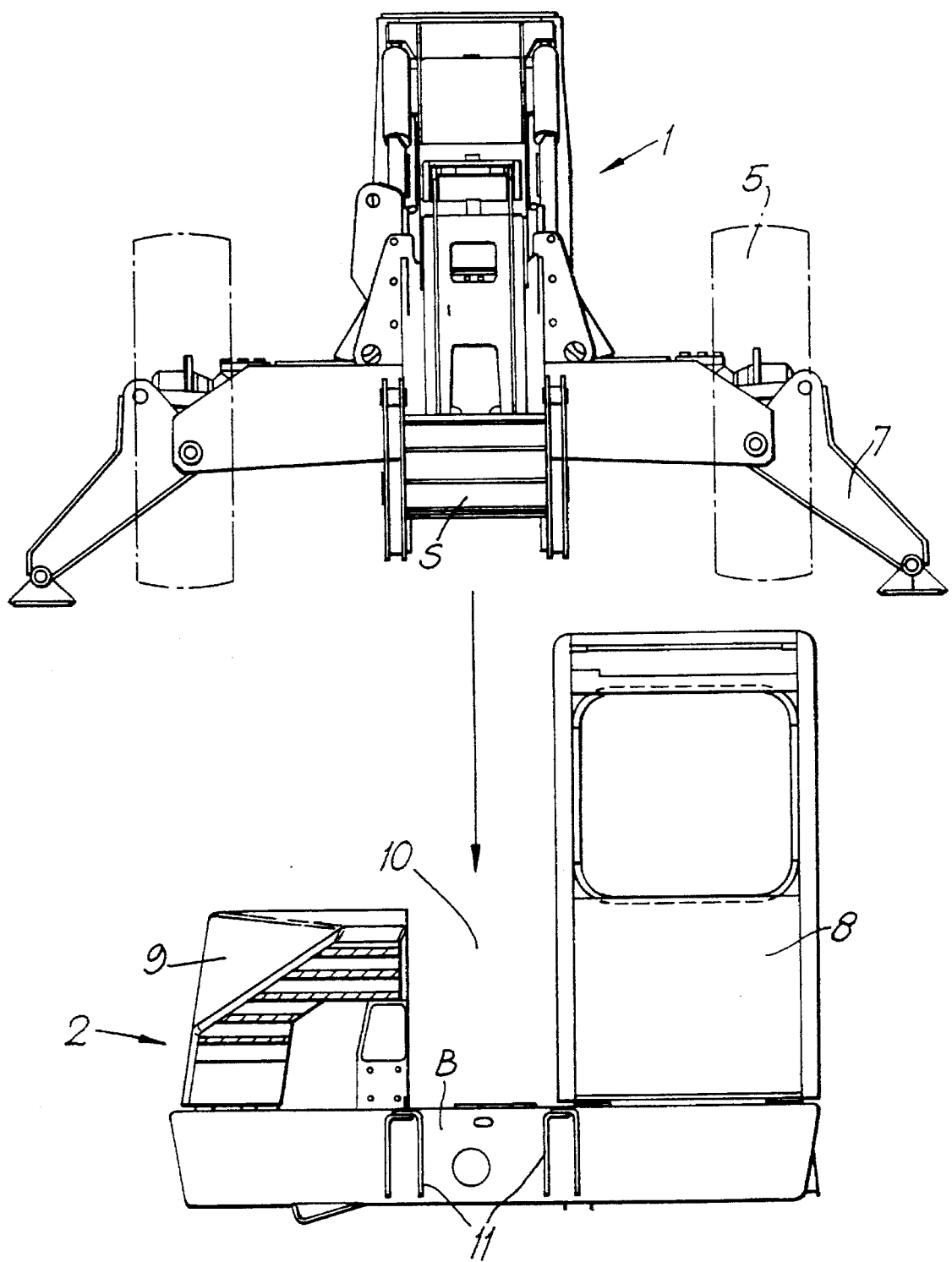
FIG. 3 is an end view showing the two modules separated.
Figure 4:
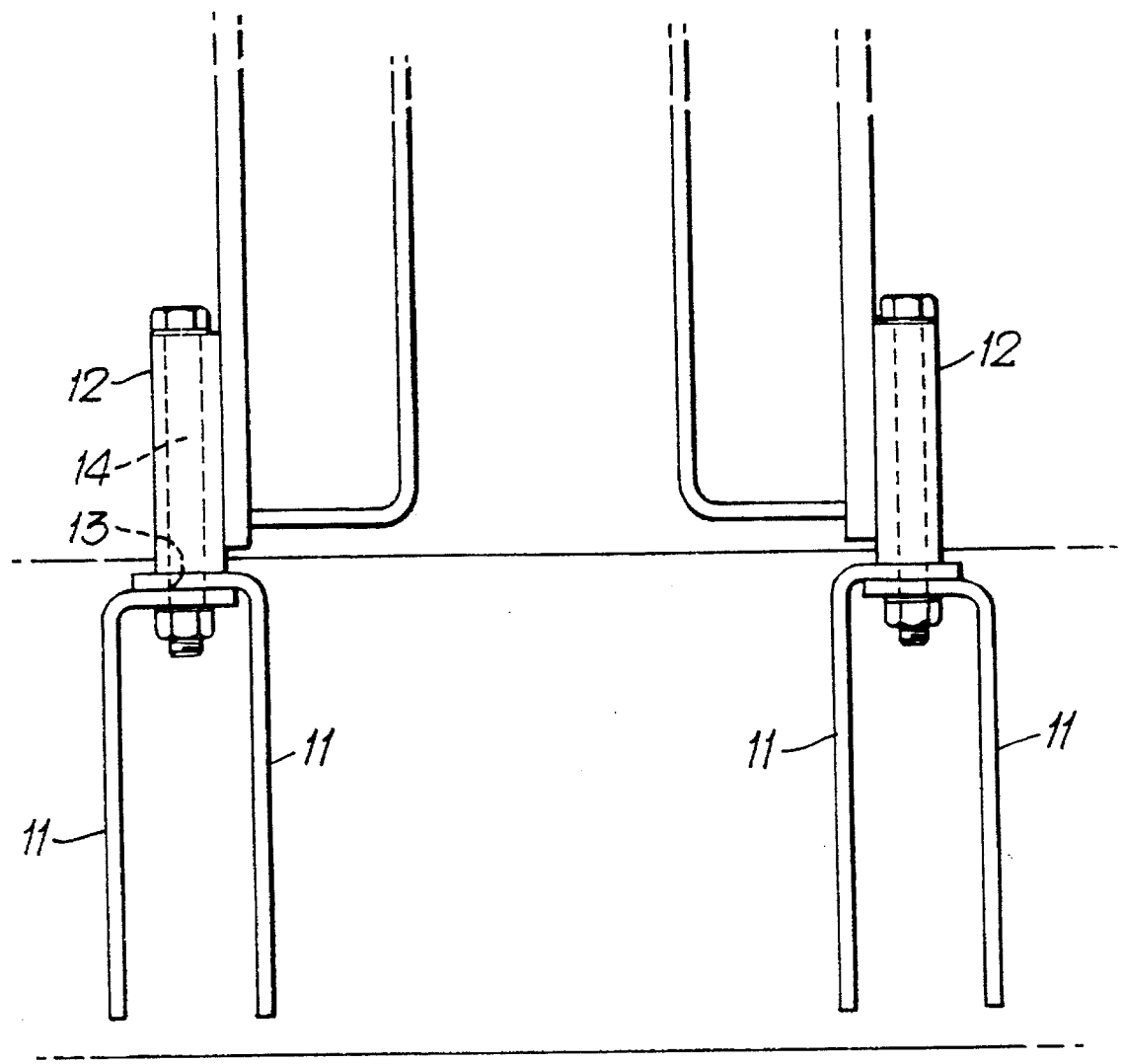
FIG. 4 is a section showing the fastening between the two modules.
Figure 5:
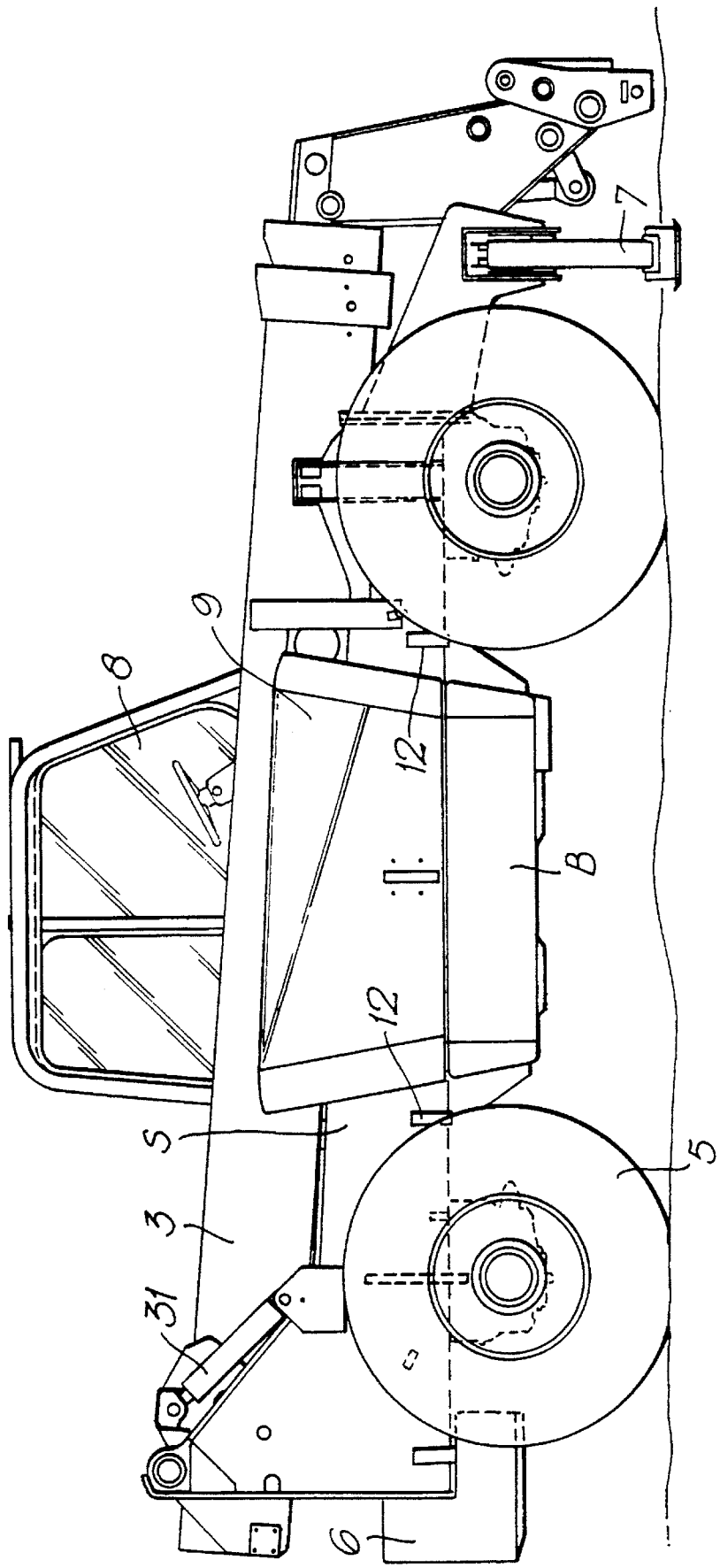
FIG. 5 is a side elevational view of the subject work machine with the first and second modules connected together.

As shown in FIGS. 1 to 3, a vehicle comprises a first 1 and second 2 chassis.

The first chassis is provided with a spine S to which are mounted a boom 3 with boom cylinders 31, a pair of axles 4, four wheels 5, a ballast weight 6, and a pair of outriggers 7.

The second chassis 2 is provided with a base B on which are mounted an operator's cab 8 and an engine module 9 together with associated transmission from the engine 90 and hydraulic control equipment 93, such as valves, pumps and filters. The transmission includes a transverse transmission 91 leading from the engine transmission to a central portion of the second chassis below a gap 10 formed between the cab 8 and engine module 9. Two drive shafts 92 extend in opposite directions from the transverse transmission 91 and substantially in the longitudinal direction of the vehicle.

Below and on either side of the gap 10 are longitudinally extending stiffening plates 11. Four cylindrical sleeves 12 are provided on the first chassis, with two being disposed on each side of the boom 3. At corresponding locations on the stiffening plates 11 of the second chassis 2, complementary holes 13 are provided.

Industrial Applicability

Figure 6:
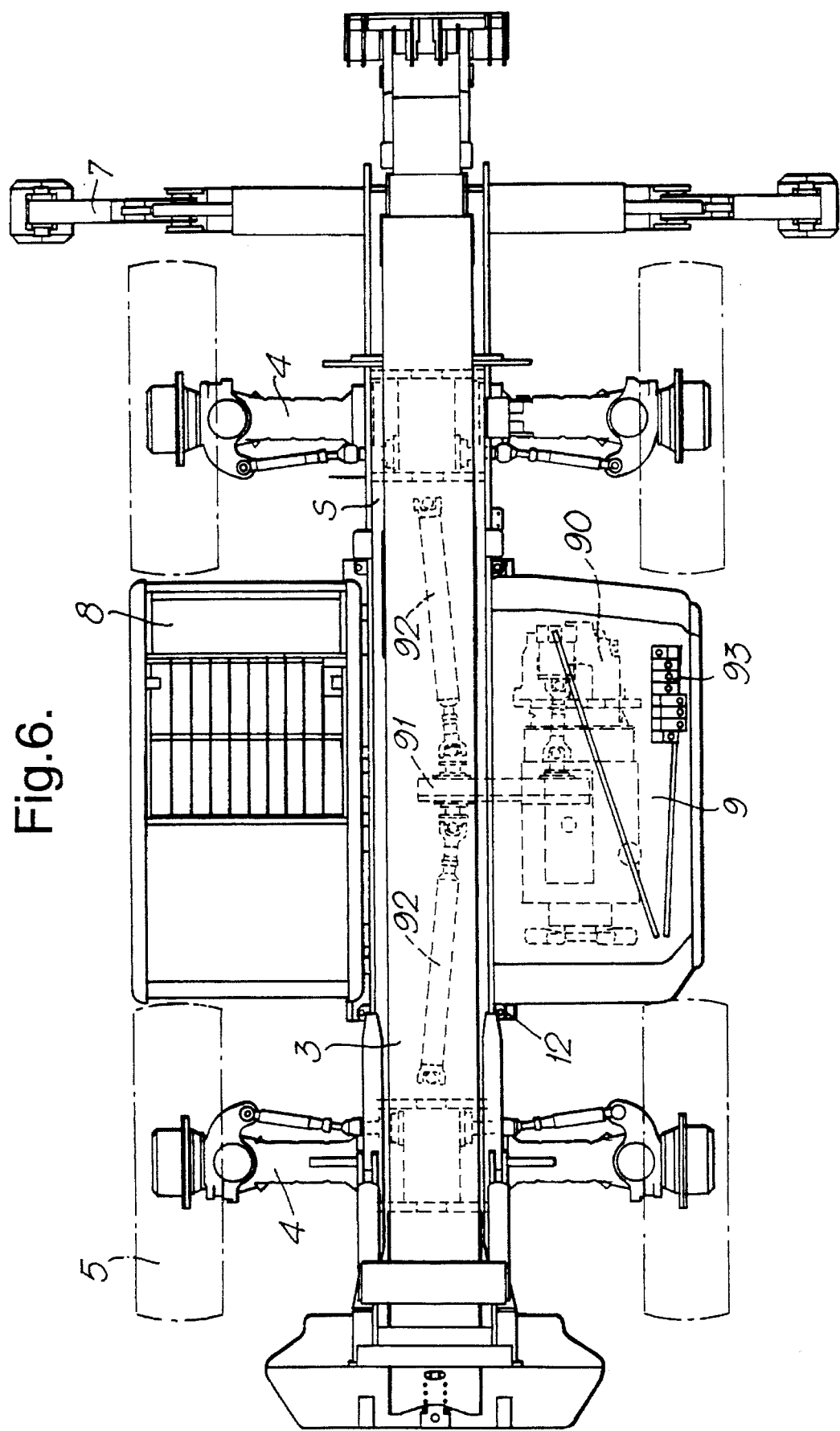
FIG. 6 is a top plan view of the subject work machine shown in FIG. 5.
Figure 7:
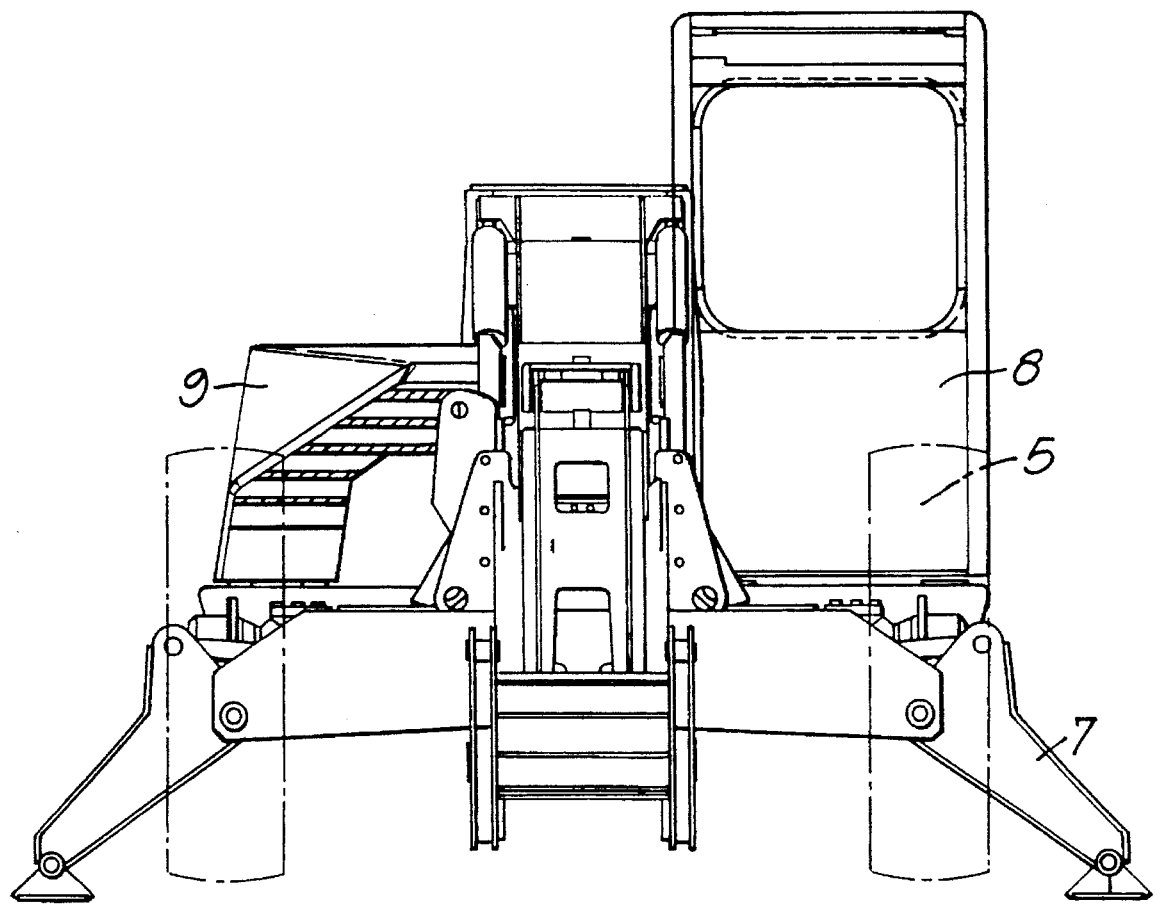
FIG. 7 is a front elevational view of the subject work machine shown in FIG. 5.

During manufacture, once the first 1 and second 2 modules have been assembled, the first module 1 is lowered onto the second module 2 with the spine 5 and boom 5 entering the gap 10, and so that the sleeves 12 are aligned with respective holes 13. The two modules are then fastened together using four bolts 14 through respective sleeves 12 and 13. As shown in FIG. 6, the cab 8 and engine module 9 are accommodated in the fore and aft direction between the wheels 5 of the first chassis 1.

The two drive shafts 92 are coupled to respective axles to make up the respective drive transmissions to the wheels. The necessary hydraulic lines, for example for brakes, raising and lowering the boom, telescopically extending the boom, tilting a tool on the end of the boom, and auxiliary functions, are coupled between the two modules.

Other aspects, objects and advantages of this invention can be obtained from a study of the drawings, the disclosure and the appended claims.

I claim:

1. A work machine, comprising:

a first chassis having a longitudinally extending spine and front and rear axles and wheels;

a separate and distinct second chassis having a base, said base having first and second side portions, an operator's cab adapted to be mounted to said first side portion of said base;

an engine adapted to be mounted to said second side portion of said base, said engine being spaced from said cab with said engine, cab, and base defining a u-shaped gap; and said spine of said first chassis being adapted to be positioned within said u-shaped gap and in contact with said base, and said first chassis being adapted to be connected to said second chassis.

2. A work machine, as set forth in claim 1, wherein said first chassis is releaseably connected to said second chassis by a plurality of threaded fasteners.

3. A work machine, as set forth in claim 1, including a telescopic boom, outriggers, ballast weight, and a plurality of hydraulic cylinders mounted to with said first chassis, and further including a plurality of hydraulic valves, hydraulic pumps and filters mounted to said second side portion of said base, and a fuel tank and a hydraulic tank mounted to said first side of said base.

4. A work machine, as set forth in claim 1, including a drive transmission and first and second drive shafts connected to said second chassis, said first drive shaft being adapted to be coupled to said front axle and said second drive shaft being adapted to be coupled to said rear axle, said first and second drive shafts completing a drive between said drive transmission and said wheels.

5. A work machine, as set forth in claim 4, wherein said first and second drive shafts are positioned below said second base.

6. A work machine, as set forth in claim 1, including a plurality of cylindrical sleeves connected to said first chassis and a plurality of stiffening plates connected to said second chassis, and further including a plurality of threaded fasteners adapted to penetrate said sleeves and said plates and connect said first chassis to said second chassis.

* * * * *